(12) United States Patent
Chuman et al.

(10) Patent No.: US 7,345,658 B2
(45) Date of Patent: Mar. 18, 2008

(54) THREE-DIMENSIONAL IMAGE DISPLAY DEVICE

(75) Inventors: Takashi Chuman, Tsurugashima (JP); Yoshihiko Uchida, Tsurugashima (JP); Hideo Satoh, Tsurugashima (JP); Takuya Hata, Tsurugashima (JP); Atsushi Yoshizawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 658 days.

(21) Appl. No.: 10/761,421

(22) Filed: Jan. 22, 2004

(65) Prior Publication Data

US 2004/0217989 A1 Nov. 4, 2004

(30) Foreign Application Priority Data

Jan. 24, 2003 (JP) ............................. 2003-015936

(51) Int. Cl.
*G09G 3/30* (2006.01)
(52) U.S. Cl. .................... 345/76; 345/6; 345/9; 345/36
(58) Field of Classification Search ................. 345/76, 345/36, 6, 9
See application file for complete search history.

(56) References Cited

U.S. PATENT DOCUMENTS

| 5,101,279 | A | | 3/1992 | Kurematsu et al. | |
|---|---|---|---|---|---|
| 5,912,649 | A | * | 6/1999 | Hattori et al. | 345/4 |
| 5,929,572 | A | | 7/1999 | Whitesell | |
| 6,054,969 | A | | 4/2000 | Haisma | |
| 6,429,599 | B1 | * | 8/2002 | Yokoyama | 315/169.3 |
| 7,006,171 | B1 | * | 2/2006 | Koden et al. | 349/61 |
| 2002/0149009 | A1 | | 10/2002 | Uchida | |

FOREIGN PATENT DOCUMENTS

| EP | 0 959 377 A2 | | 11/1999 |
|---|---|---|---|
| JP | 11-007893 A | * | 1/1999 |
| JP | 2000-115812 A | | 4/2000 |
| WO | WO 02/086610 A1 | | 10/2002 |

* cited by examiner

*Primary Examiner*—Richard Hjerpe
*Assistant Examiner*—Leonid Shapiro
(74) *Attorney, Agent, or Firm*—Sughrue Mion, PLLC

(57) ABSTRACT

A three-dimensional image display device including at least one transmissive light-emitting display panel and a second light-emitting display panel located behind the transmissive panel. The transmissive panel has a plurality of light-emitting portions arranged in two dimensions and classified into plural linear groups. The transmissive panel has a plurality of bus lines each of which is connected to and overlapping with the light-emitting portions in per group. Each light-emitting portion includes a light-emitting layer made of an organic compound exhibiting electroluminescence. Each overlapped portion of the bus line has an area equal to or smaller than 5% of an area of each of the light-emitting portions.

7 Claims, 5 Drawing Sheets ary of the Related Art

THREE-DIMENSIONAL IMAGE DISPLAY DEVICE

BACKGROUND OF THE INVENTION

1. Field of the Invention

The present invention relates to a three dimensional image display device with a transmission type light-emitting display panel having a light-emitting portion.

2. Description of the Related Art

As a transmission type light-emitting display panel having a light-emitting portion, for example, an electroluminescent display panel is known, which utilizes a thin film of an inorganic or organic material exhibiting electroluminescence (hereinafter referred to as EL), i.e. light emission caused by injection of an electric current, and which contains a light-emitting layer made of such EL material.

One of the applications of such transmission type light-emitting display panel is a three dimensional image display device. For example, when viewing an image on a backside display panel together with an identical image on a front transmission type light-emitting display panel placed away from the backside display panel in a depth direction of the image, an observer does not see two images of different depths but a single image resulting from the merge of the two images. According to this principle, there is provided a three dimensional image display device, in which two identical images are changed in luminosity (brightness) ratio therebetween thereby to permit an observer to construct the merged image thereof as a three dimensional image in his or her head (for example, see JP-A-2000-115812).

However, the moire caused by interference of two stripe groups images may occur generally in a display panel displaying an image, as is not always limited in the case of three dimensional image display devices.

SUMMARY OF THE INVENTION

Therefore, one of challenges that the invention is to solve is, as an example, to provide a three-dimensional image display device, which can make it harder for an observer to recognize the moire and offer a clear picture image to the observer.

A three dimensional image display device according to the invention comprises:

at least one transmissive light-emitting display panel; and
a second light-emitting display panel located behind said transmissive display panel,
wherein said transmissive display panel includes a plurality of light-emitting portions arranged in two dimensions and a plurality of bus lines each of which is connected to and overlapping with the light-emitting portions so that the light-emitting portions are classified into plural linear groups, and
wherein each of the light-emitting portions includes a light-emitting layer made of an organic compound exhibiting electroluminescence, and
wherein each of the plurality of bus lines has portions overlapping with said light-emitting portion, each of the portions having an area equal to or smaller than 5% of an area of each of the light-emitting portions.

BRIEF DESCRIPTION OF THE DRAWINGS

FIGS. 9-11 are each a plan view of a pixel portion of a transmission type front light-emitting display panel in the three dimensional image display device of another embodiment according to the invention.

DETAILED DESCRIPTION OF THE INVENTION

Embodiments of the three dimensional image display device according to the invention will be described in reference to the drawings.

Figure 1:
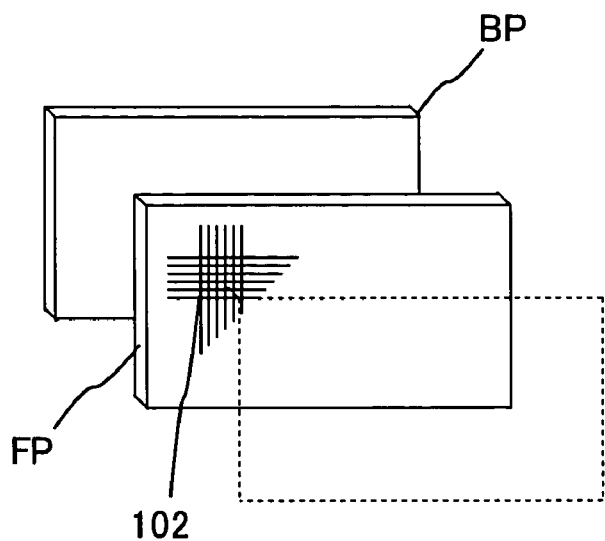
FIG. 1 is a schematic perspective view showing a three-dimensional image display device of an embodiment according to the invention.

FIG. 1 shows a three dimensional image display device containing a transmission type front light-emitting display panel FP and a backside light-emitting display panel BP, which are supported by a frame (not shown) and located in such a way that one lies before the other along a direction of the normals with respect to their display surfaces. Such display device has electric circuits such as a power source, an address driver, a data driver, and a controller, which are not shown, in addition to the front and backside display panels.

The transmission type front light-emitting display panel FP may be, for example, a transmission type organic EL display device configured of a plurality of organic EL elements according to the passive matrix driving method. The backside light-emitting display panel BP may be an organic EL display device configured of a plurality of organic EL elements according to the active matrix driving method, for example.

The backside light-emitting display panel BP contains, on the display surface, n scanning lines individually formed at given intervals in parallel to a horizontal direction and m data lines individually formed at given intervals in parallel to a vertical direction, in which the scanning lines and the data lines are spaced by a given distance away from each other and located in such a way as to form a right angle therebetween. Consequently, light-emitting portions 102 are formed at respective portions corresponding to the intersection points of n scanning lines and m data lines and hence the number of which is n times m (n×m). In addition, the display device also contains a source line, etc., which is connected to each of the light-emitting portions 102. One end of each of the lines is connected to the corresponding driver. More specifically, the address driver applies a voltage to the scanning lines one at a time in order. The data driver applies a data voltage for causing the light-emitting portions to emit light to the data lines. The controller is connected with the address and data drivers to control the operations of the address and data drivers according to a previously supplied image data.

Figure 2:
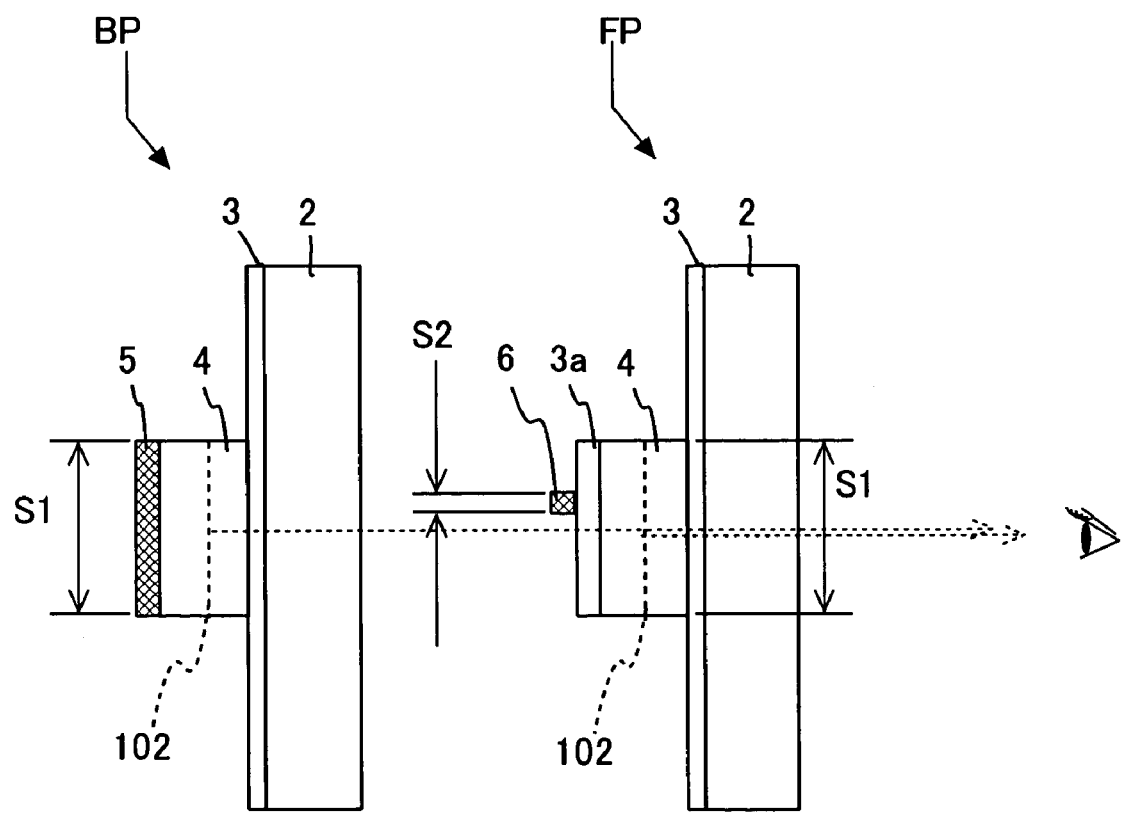
FIG. 2 is a schematic partial sectional view showing a transmission type front light-emitting display panel and a backside light-emitting display panel in the three dimensional image display device of the embodiment according to the invention.
Figure 3A:
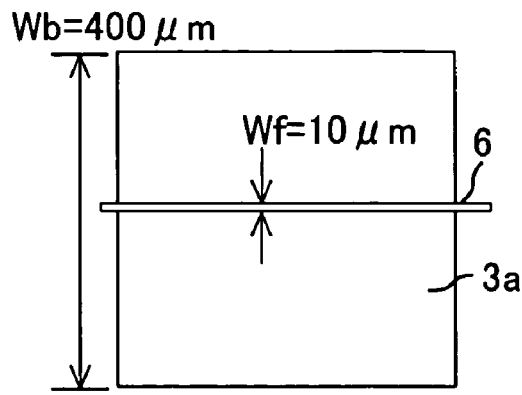
FIGS. 3A-3D are each a plan view of a pixel and a bus line of a light-emitting portion in the transmission type front light-emitting display panel of the embodiment according to the invention.
Figure 3B:
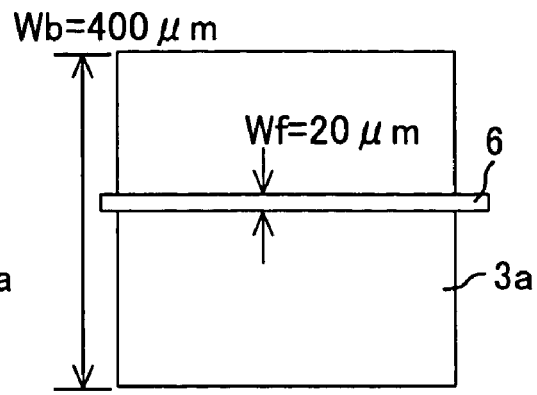
Figure 3C:
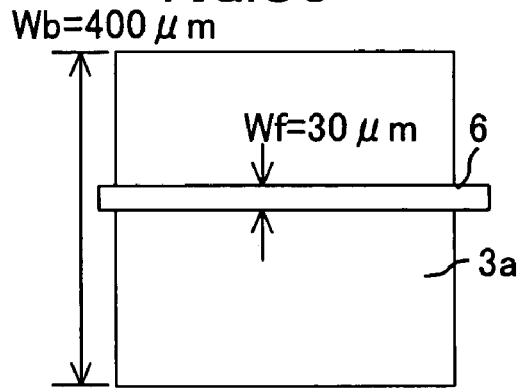
Figure 3D:
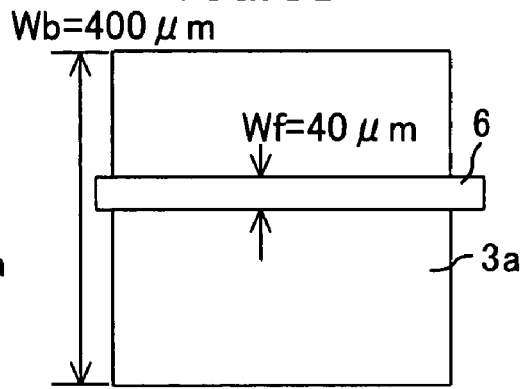

As shown in FIG. 2, taking, for example, the transmission type front light-emitting display panel FP and the backside light-emitting display panel BP, when the transmission type front light-emitting display panel FP is placed away from the backside light-emitting display panel BP in its depth direction, the light emission from both the display panels is viewed from the front side. The light-emitting portion 102 of an organic EL element in the backside light-emitting display panel BP has a structure such that on a glass substrate 2 are stacked in turn a transparent electrode 3, a plurality of organic compound material layers 4 including a light-emitting layer, which are substantially transparent when the element emits no light, and a metal electrode 5, as shown in FIG. 2. Further, the light-emitting portion 102 of an organic EL element in the transmission type front light-emitting display panel FP has a structure such that on a glass substrate 2 are stacked in turn a transparent electrode 3, a plurality of organic compound material layers 4 including a light-emitting layer, which are substantially transparent when the element emits no light, and a second transparent electrode 3a, as shown in FIG. 2.

Accordingly, the lights from the organic EL element light-emitting portions 102 of the backside light-emitting display panel BP and transmission type front light-emitting display panel FP propagate toward an observer on the front side, and hence when the observer views same images on the display panels produced by the emitted light with a given ratio of the luminosity (brightness), the observer can view a single image resulting from the merge of the two images different in depth. At this time, the observer can recognize the merged image of a given brightness ratio as a three dimensional image in his or her head.

This three-dimensional image display device requires no 3D-specific glasses and permits natural three-dimensional display, and therefore the display device causes the observer to feel fatigue less frequently.

In this embodiment, the transmission type front light-emitting display panel FP has a plurality of light-emitting portions 102 arranged in two dimensions, as shown in FIG. 1, each including a light-emitting layer made of an organic compound exhibiting electroluminescence. Further the transmission type front light-emitting display panel FP has a plurality of bus lines 6, as shown in FIG. 2, built in such a way as to be respectively connected to groups (of rows or columns) of adjacent light-emitting portions 102 of the light-emitting portions. When the bus line 6 overlaps the light-emitting portion 102, the bus line has an overlap portion having an area of S2 equal to or less than 5% of the area S1 of the light-emitting portion 102. In other words, the total area of the bus line is equal to or less than 5% of that of the light-emitting portion.

Transparent electrodes are generally used for the cathodes of the transmission type front light-emitting display panel FP in the case where the transmission type front light-emitting display panel FP and the backside light-emitting display panel BP are superposed over and in parallel with each other so that the pixels of one panel correspond to the respective ones of the other panel and thus arranged display panels perform display thereby to provide a 3D display. The transparent electrode has a resistance value higher than that of a metal electrode, and hence the transparent electrode needs to be connected using a bus line made of a metal or metal alloy, such as aluminum with a low resistance.

The moire occurs under the influence of opaque bus lines of a metal or the like. Therefore, in order to suppress the moire, a 3D display configured of a transmission type front light-emitting display panel FP and a backside light-emitting display panel BP was made to check the influence of the bus lines. The 3D displays were fabricated by using standard organic EL display panels for the backside light-emitting display panel BP and transparent organic EL display panels for the transmission type front light-emitting display panel FP. The details of the 3D display are as follows.

[Backside Light-Emitting Display Panel]

First, a layer of indium tin oxide (ITO) was grown to a thickness of 1000 angstroms on a glass substrate. Then, the resulting ITO film underwent the patterning with pixel sizes of 400 µm×400 µm to form a plurality of ITO transparent electrodes (anodes) arranged in the form of a dot matrix with a periodic pattern.

The transparent electrode (anode) was partially exposed for the formation of a light-emitting portion thereon. On the remaining portion of the electrode, a polyimide layer with a thickness of 3000 angstroms was formed in order to suppress the leakage of electric current and the layer underwent patterning for the insulating layer IL.

Then, a cathode partition was formed with a resist keeping clear of the exposed portion of the transparent electrode (anode) in order to pattern a cathode, which was to be formed later, into an arbitrary shape.

The organic compound material layers making up the organic EL element were in turn grown on the transparent electrode (anode) by the vacuum deposition technique. The following materials were used for the layers: copper phthalocyanine (CuPc) for a hole injection layer; 4,4'bis(N-(naphthyl)-N-phenyl-amino)biphenyl (NPB) for a hole transport layer; tris(8-hydroxyquinolinolato N1,O8) aluminum (Alq3) for a light-emitting layer; 2,9-dimethyl-4,7-diphenyl-,1,10-phenathroline (BCP) for an electron transport layer; and LiF for an electron injection layer. During this process, the film-growing area was restricted by a patterning mask.

On the electron injection layer, an aluminum (Al) film was grown to a thickness of 1000 angstroms by the vacuum deposition technique, when a metal electrode (cathode) pattern was formed using the cathode partition without the use of a mask.

In order to protect the organic EL element, the element was sealed with a glass covering from the upside of the metal cathode pattern.

[Transmission Type Front Light-emitting Display Panel]

Using indium zinc oxide (IZO) for the transparent cathode instead of the Al cathode pattern, an Al film was grown on the transparent cathode to a thickness of 1000 angstroms by the vacuum deposition technique. Thus, an transmission type front light-emitting display panel was manufactured, which was the same as the above-described backside light-emitting display panel except that the bus line pattern was formed with its line width (Wf) changed to 10 µm, 20 µm, 30 µm, or 40 µm. FIGS. 3A, 3B, 3C and 3D each show a plan view of the pixel (Wb=400 µm) and bus line (Wf=10 µm, 20 µm, 30 µm, or 40 µm) of a light-emitting portion in the transmission type front light-emitting display panel. The bus line 6 for connecting an adjacent transparent cathode 3a was formed in a straight-line form extending in a horizontal direction.

[Panel Assembling]

The transmission type front light-emitting display panel FP and the backside light-emitting display panel BP were spaced apart by a given distance of 5 mm, fixed to and in parallel with each other through spacers, and connected with drive circuits thereby to bring the three dimensional image display device to completion.

[Evaluation]

By controlling the difference in image luminosity between the transmission type front light-emitting display panel and the backside light-emitting display panel, observers could feel a stereoscopic effect on an image in each display. The results of the observation of moire are presented in Table 1.

TABLE 1

| Bus Line Width (μm) | Areal Ratio (%) | Moire |
|---|---|---|
| 10 | 2.5 | not observed |
| 20 | 5 | not observed |
| 30 | 7.5 | observed |
| 40 | 10 | observed |

The areal ratio is here a representation by percentages of "and area of a portion where a bus line overlaps a light-emitting portion" divided by "an area of the light-emitting portion." With bus line widths of 10 μm (areal ratio: 2.5%) and 20 μm (areal ratio: 5%), the moire was not seen.

[Alternatives]

In the experiment described above, as shown in FIG. 4, a hole injection layer 41, a hole transport layer 42, a light-emitting layer 43, an electron transport layer 44, an electron injection layer 45, and a transparent cathode 3a were stacked in turn on a transparent anode 3 on a transparent substrate 2 while defining them with an insulating layer IL, and then a bus line 6 having a small line width was formed on the transparent cathode 3a. Thus, the transmission type front light-emitting display panel was manufactured. However, other possible organic EL element structures include a structure which is the same as that shown in FIG. 4 except that the electron injection layer between the electron transport layer 44 and the transparent cathode 3a is omitted, as shown in FIG. 5.

Figure 4:
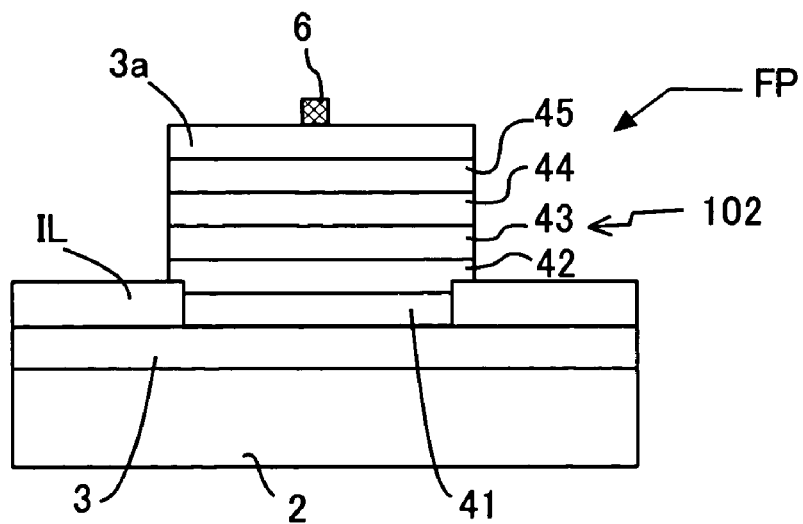
FIG. 4 is a sectional view of an organic EL element of the transmission type front light-emitting display panel in the three-dimensional image display device of the embodiment according to the invention.
Figure 5:
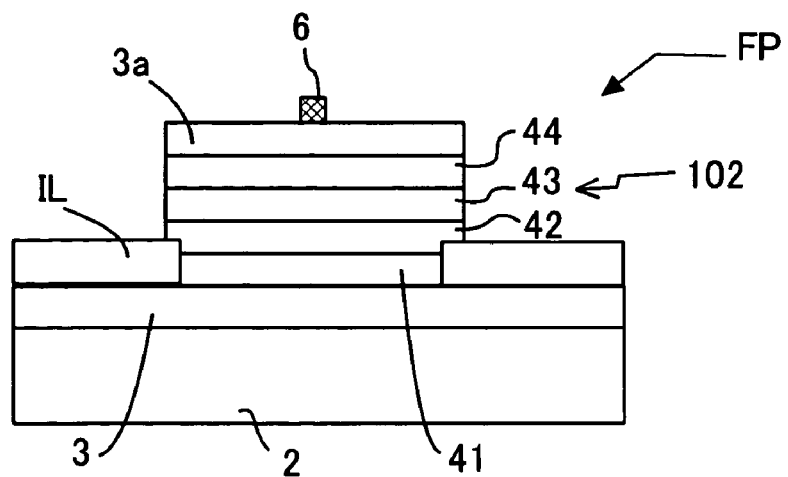
FIGS. 5-8 and 10 are each a sectional view of an organic EL element of a transmission type front light-emitting display panel in a three dimensional image display device of another embodiment according to the invention.
Figure 6:
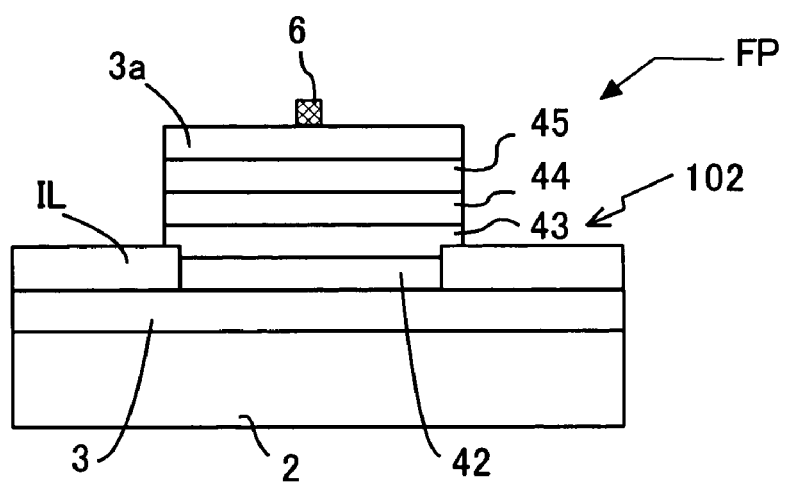

Also, the other possible organic EL element structures include a structure which is the same as that shown in FIG. 4 except that the hole injection layer between the anode 3 and the hole transport layer 42 is omitted, as shown in FIG. 6.

Figure 7:
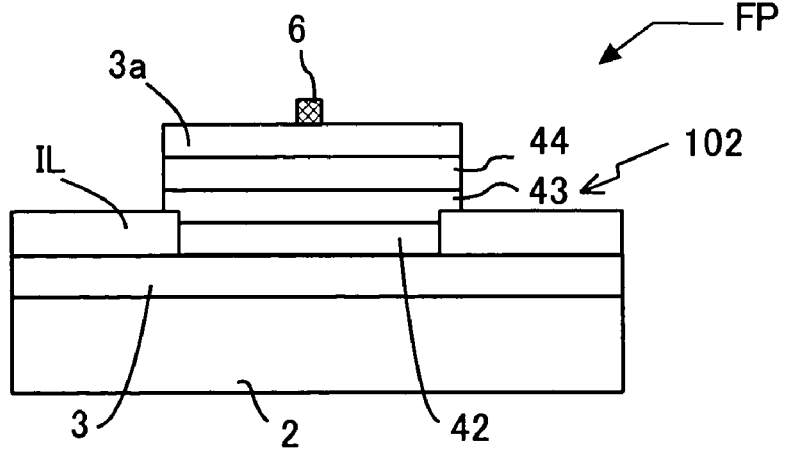

The other possible organic EL element structures further include a structure which is the same as that shown in FIG. 4 except that the electron injection layer and the hole injection layer are omitted, as shown in FIG. 7.

Figure 8:
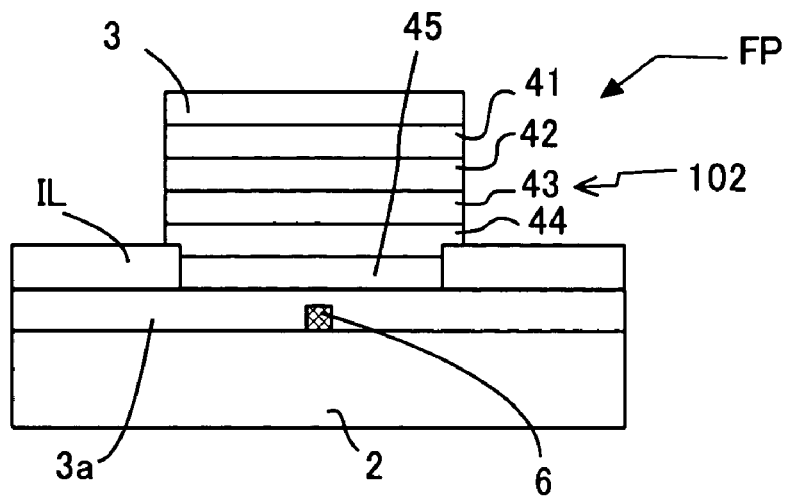

Although a so-called forward direction stacking has been adopted in configuration of the transmission type front light-emitting display panel, the transmission type front light-emitting display panel can be also obtained by the reverse direction stacking in which the positions of the transparent anode and the cathode are reversed. In this case, as shown in FIG. 8, the organic EL element structure is achieved by the following process. A bus line 6 having a small width is formed on a transparent substrate 2, such as a glass substrate. Then, a transparent cathode 3a is formed thereon in such a way as to bury the bus line, on which an electron injection layer 45, an electron transport layer 44, a light-emitting layer 43, a hole transport layer 42, a hole injection layer 41, and a transparent anode 3 are stacked in turn while defining them with an insulating layer IL. The bus line 6 can be formed on a glass substrate 2 by etching and hence a metal with a lower resistance, e.g. silver (Ag), may be used for the bus line to reduce the area of the bus line overlapping the light-emitting portion of a pixel portion.

Figure 9:
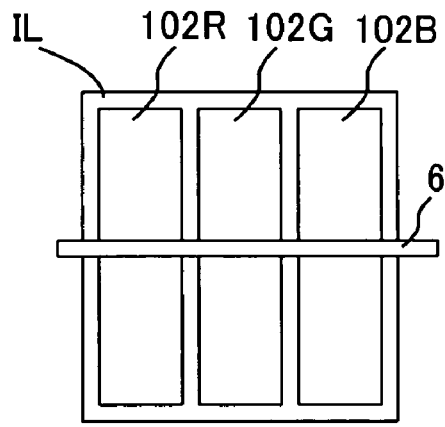

Although the above embodiments have been described only for a monochromatic wave length, a polychromatic light-emitting display device may be achieved as an alternative embodiment by independently and separately stacking, in a pixel portion at each matrix location, light-emitting layers, each of which is made of a different organic compound material exhibiting EL of a different light emission color, blue, green, or red, at the time of the application of an electric current. In this case, as shown in FIG. 9, a multi-pixel matrix driving display device can be obtained, in which a set of organic EL element light-emitting portions 102R, 102G, and 102B of the light emission colors, red, green, and blue, connected to a bus line 6, is defined as a unit pixel by an insulating layer IL.

Figure 10:
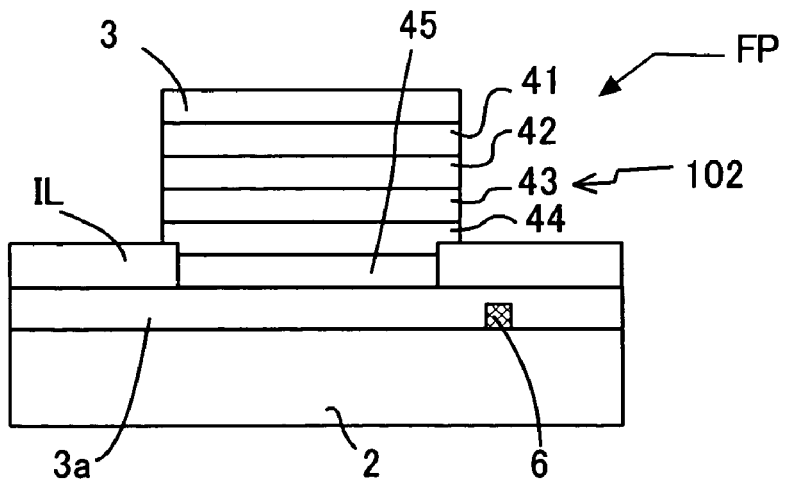
Figure 11:
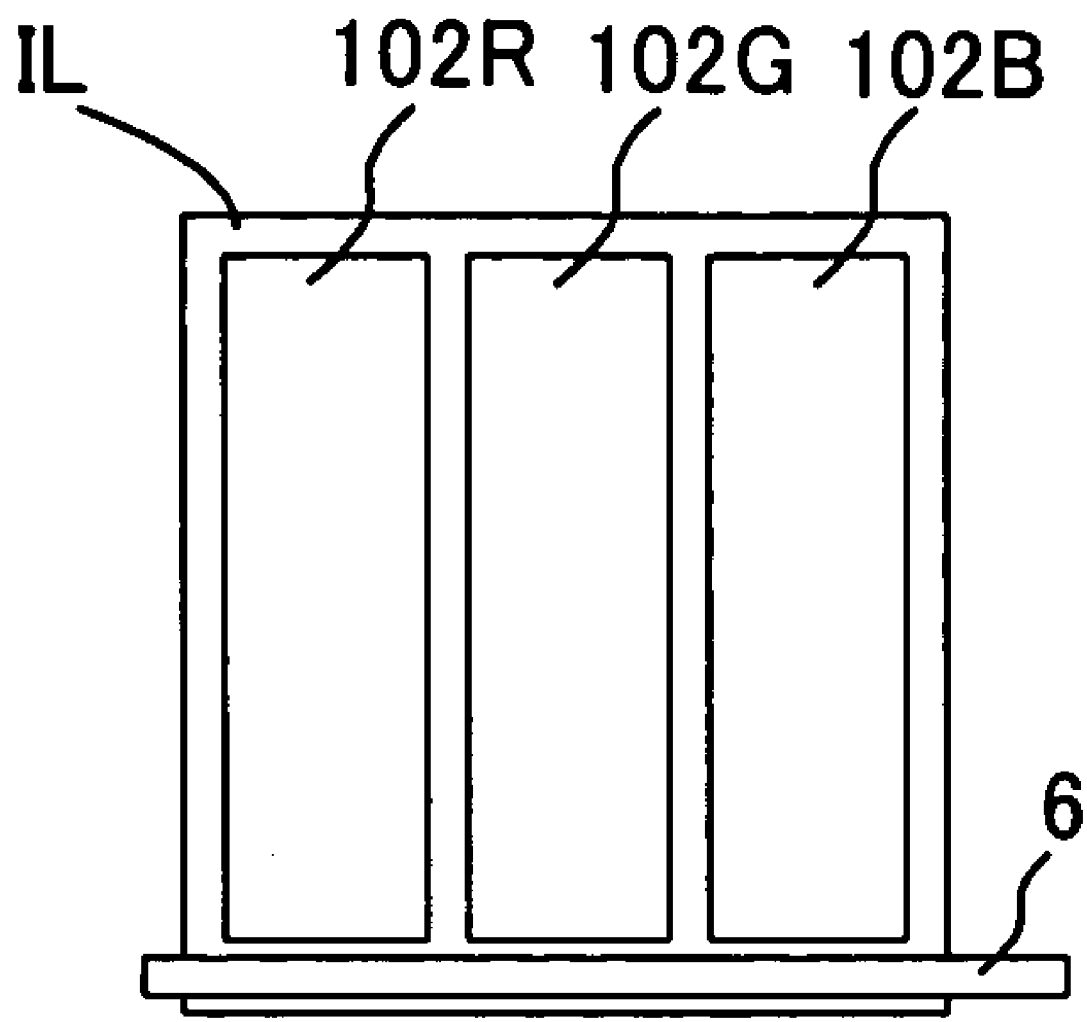

In the case where the bus line 6 is buried in the transparent cathode 3a, the bus line 6 may be provided under the insulating layer IL in order to prevent a step from developing in the organic compound material layer lying thereon, as shown in FIG. 10. Thus, a 3D display can be realized, in which the bus line 6 is dislocated in such a way as to overlap a portion other than the light-emitting portion including a light-emitting layer as shown in FIG. 11, and the occurrence of moire is suppressed.

Although the 3D display is made up of two panels, i.e. a backside light-emitting display panel BP and a transmission type front light-emitting display panel FP, in the above embodiments, another transmission type front light-emitting display panel may be further added thereto and superposed thereon, as shown by a broken line in FIG. 1, thereby to make up such 3D display from a backside light-emitting display panel and a plurality of transmission type front light-emitting display panels.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese patent application No. 2003-15936 which is herein incorporated by reference.

What is claimed is:

1. A three-dimensional image display device comprising:
at least one transmissive light-emitting display panel; and
a second light-emitting display panel located behind said transmissive light-emitting display panel,
wherein said transmissive light-emitting display panel includes a plurality of light-emitting portions arranged in two dimensions and a plurality of bus lines each of which is connected to and overlapping with the light-emitting portions so that the light-emitting portions are classified into plural linear groups, and
wherein each of the light-emitting portions includes a light-emitting layer made of an organic compound exhibiting electroluminescence, and
wherein each of the plurality of bus lines has portions overlapping with said light-emitting portion, each of the portions having an area equal to or smaller than 5% of an area of each of the light-emitting portions.

2. The three-dimensional image display device according to claim 1, wherein
the light-emitting portions of said transmissive light-emitting display panel are located in a periodic pattern; and said second light-emitting display panel has light-emitting portions located in the periodic pattern.

3. The three-dimensional image display device according to claim 2, wherein the periodic pattern has a matrix layout.

4. The three-dimensional image display device according to claim 1, wherein
the light-emitting portion of said transmissive light-emitting display panel includes
at least one organic compound material layer made of an organic compound in contact with the light-emitting layer and supplying holes or electrons to the light-emitting layer, and
a pair of transparent electrodes sandwiching the light-emitting layer and the organic compound material layer therebetween; and
one of the transparent electrodes is connected to the bus line.

5. The three-dimensional image display device according to claim 4, wherein the one transparent electrode connected to the bus line is a cathode.

6. The three-dimensional image display device according to claim 4, wherein the bus line is buried in the one transparent electrode.

7. The three dimensional image display device according to claim 4, wherein the bus line is dislocated so as not to overlap the light-emitting layer and buried in the one transparent electrode.

* * * * *